June 2, 1931.  W. K. EDWARDS  1,808,299
LOCK FOR ROD COUPLINGS
Original Filed Dec. 30, 1929
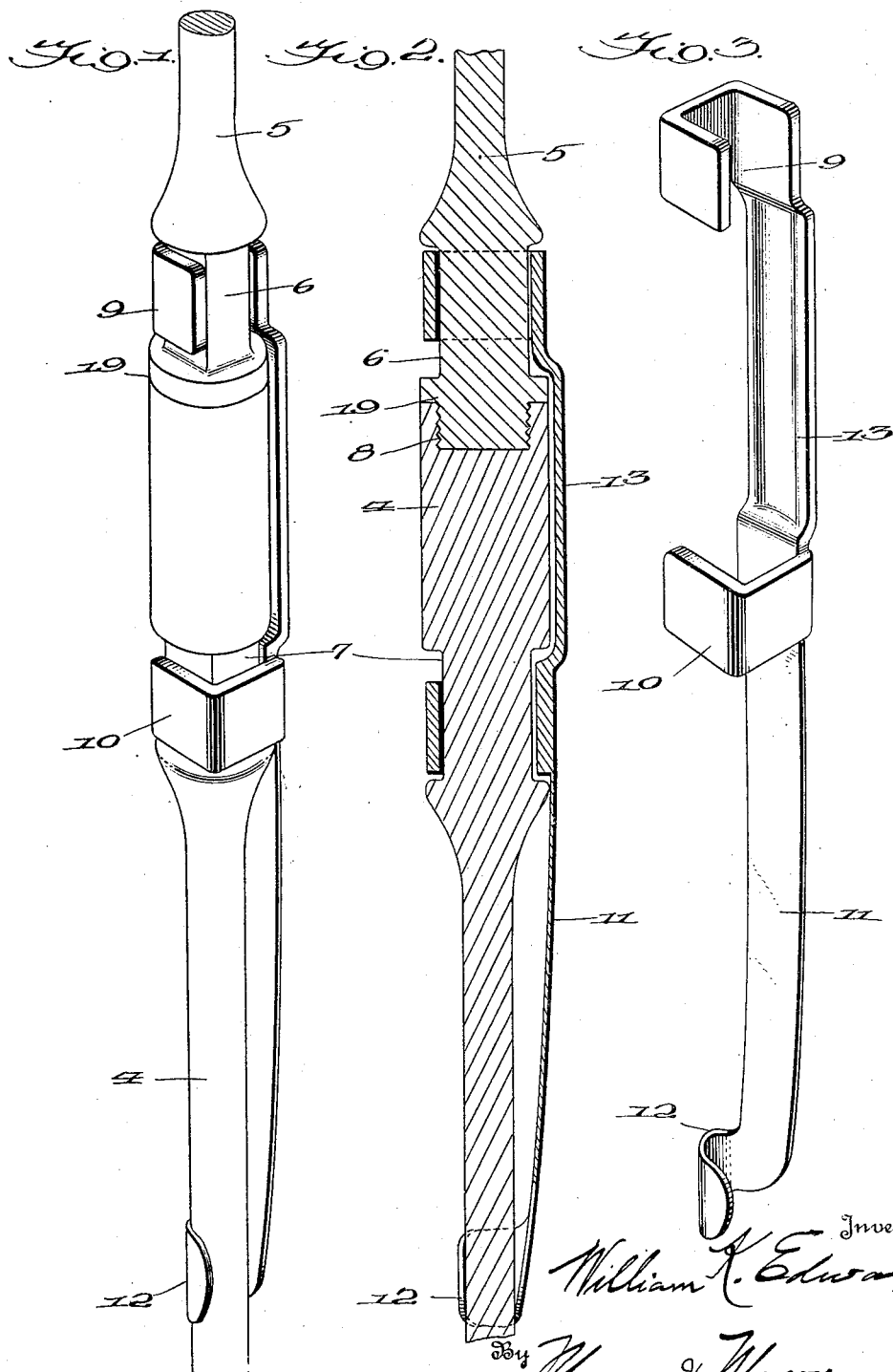

Patented June 2, 1931

1,808,299

UNITED STATES PATENT OFFICE

WILLIAM K. EDWARDS, OF BIG SPRING, TEXAS

LOCK FOR ROD COUPLINGS

Application filed December 30, 1929, Serial No. 417,460. Renewed April 20, 1931.

This invention relates to coupling locks for standard rod couplings, which are primarily for use in connection with the rods of oil well pumps.

In pumps for oil and other wells, the pump rod sections are ordinarily connected by threads and the sections frequently become unscrewed, thereby causing much trouble and annoyance in connecting together the separated elements of the couplings. This invention comprises a locking device, of simple and efficient construction, which is adapted to be applied to the joints of rod couplings generally, and which prevents such couplings from being unscrewed until the locking device is removed. The locking device, as herein shown, comprises a flat or other shaped bar of metal provided with two socket members which embrace, respectively, squared or other non-circular portions of the coupling, on opposite sides of the threaded joint thereof, together with an elongated extension of the locking device which is in part of resilient metal, whereby it may be engaged with or disengaged from the rod. By this construction, when the device is assembled in position upon the rod, it will effectively prevent unscrewing of the parts thereof, but when the locking device is removed, the parts of the joint may be easily separated.

In the accompanying drawings, which show a device embodying the invention:

Fig. 1 is a perspective view of the two members of a rod coupling with the locking device applied thereto;

Fig. 2 is a longitudinal section thereof, and

Fig. 3 is a perspective view of the locking device disassembled from the joint.

The ordinary pump rod sections, 4, 5, are connected as shown by the engagement of the external and internal threads 8. An annular shoulder 19 is formed beyond the external thread of the member 5 and limits the extent of movement of the two threaded parts upon each other. As herein shown, the section 4 is provided with a squared or rectangular portion 7, while the member 5 is provided with a similar rectangular or squared portion 6, said portions being respectively located upon opposite sides of the threaded joint 8.

The locking device, as shown in Fig. 3, comprises a preferably flat section 13 having at its upper terminal an open, preferably squared socket 9, and located therebelow a similar socket 10, the open mouths of the sockets 9, 10, facing in opposite directions as shown. A flat, resilient metal extension 11 projects beyond the socket 10, and terminates at its lower end portion in a curved rod embracing hook 12. As will be seen from an inspection of Fig. 1, when the locking device is in position upon the members of the rod, the sockets 9, 10 respectively embrace the squared portions 6, 7, on the rod sections, thereby rigidly holding said sections against relative turning movement so as to prevent the unscrewing of the sections. The hook 12 at the lower end of the resilient extension 11 of the lock embraces the circular portion of the section 4 of the pump rod, and serves when in position to hold the sockets 9, 10, of the locking device against removal or displacement, and until the device is intentionally disconnected from the pump rod.

In order to disconnect the locking device from the sections or pump rod, the resilient extension 11 is grasped by the hand and bowed outwardly, which permits the hooked end 12 to be disengaged from the rod section 4, below the coupling, whereupon the lock is easily removed. The lock is replaced upon the members of the joint constituting the rod coupling, by reversing the operation employed in removing it; that is, the oppositely facing socket members 9, 10, are first placed about the squared portions 6, 7, of the coupling members, the extension 11 is then bent laterally or bowed, the hook shaped portion 12 is caused to engage the rod section 4, and the part 11 is then permitted to resume its normal straightened condition, whereby the lock is properly held in place so as to lock and prevent rotation of the members of the threaded connection 8.

While I have herein shown the sockets 9, 10, and the portions 6, 7, which are embraced by said sockets, as square in cross section, it is obvious that these parts may be of other forms in cross section, as it is within the spirit of the invention if said parts are of such cross section as to prevent relative rotary movements of the sockets and the parts of the coupling which are embraced thereby, when the locking device is in position.

Having thus fully described my invention, what I claim is:—

1. A lock for rod couplings comprising a longitudinal portion having at spaced points thereon oppositely facing, non-circular socket members to embrace similarly shaped cross sectional portions of a rod coupling, and a resilient arm extending from one of said members and provided with a hook to engage the rod at a point removed from the coupling.

2. As an article of manufacture, a rod coupling lock comprising a body member having at one end an open, rectangular socket, and spaced therefrom another open rectangular socket facing in the opposite direction, and a resilient extension from the last-named socket provided at its end with a hook shaped portion which faces in the opposite direction from said last-named socket.

3. In a device of the class described, the combination of a rod coupling having upon opposite sides of the usual coupling threads rectangular portions, in combination with a lock provided with oppositely facing rectangular sockets to embrace said portions, a connecting web, and a resilient extension provided with a hook shaped member to embrace a pump rod at a point remote from the threaded connection and serving to hold said lock in position upon the coupling members.

4. In a device of the class described, the combination of rod sections having threaded connections, non-circular portions on opposite sides of said connections, and a locking device comprising two oppositely facing non-circular sockets shaped to embrace the non-circular portions of said coupling members, said lock having also a resilient extension terminating in a hook.

In testimony whereof I have hereunto set my hand this 26th day of December A. D. 1929.

WILLIAM K. EDWARDS.